June 22, 1937.  W. J. O'LEARY  2,084,590

ELECTRIC MOTOR

Filed Sept. 1, 1934

Inventor
William J. O'Leary
By Walker and Dybvig
Attorney

Patented June 22, 1937

2,084,590

UNITED STATES PATENT OFFICE 2,084,590

ELECTRIC MOTOR

William Joseph O'Leary, Dayton, Ohio

Application September 1, 1934, Serial No. 742,399

17 Claims. (Cl. 172—278)

This invention relates to induction motors and in more particular to variable speed and reversible induction motors.

Induction motors have a speed that ordinarily is a function of the frequency, the magnitude of the voltage and the load. The voltage may possibly be changed in magnitude but such a change is expensive and therefore prohibitive. Ordinarily the frequency cannot very well be changed as the frequency remains constant. If the supply is 60 cycles it remains 60 cycles and the speed cannot very well be changed by changing the frequency. Ordinarily changing the load is out of the question and its cost prohibitive.

An object of this invention is to provide a motor wherein the speed may be changed without varying the frequency of the voltage, and without changing the load supplied thereto.

Another object of this invention is to provide a phase shifting device that is variable so as to vary the speed and the direction of rotation of the motor.

Another object of this invention is to provide a motor that is easily constructed, that is cheap, that is efficient, that is dependable, with the minimum amount of labor required.

Another object of this invention is to mount a rotor within a stator that may be varied in its characteristics.

Another object of this invention is to provide means for actuating the change speed mechanism.

Another object of this invention is to provide a choke coil that is movable about the axis of the armature.

Another object of the invention is to provide a stator that is made of laminations arranged in interlocked relation.

Another object of this invention is to provide a stator that includes a shell concentric with respect to the rotor.

With the above primary and other incidental objects in view, as will more fully appear in the specification, the invention consists of the features of construction, the parts and combinations thereof, and the mode of operation, or their equivalents, as hereinafter described and set forth in the claims.

Figure 1:
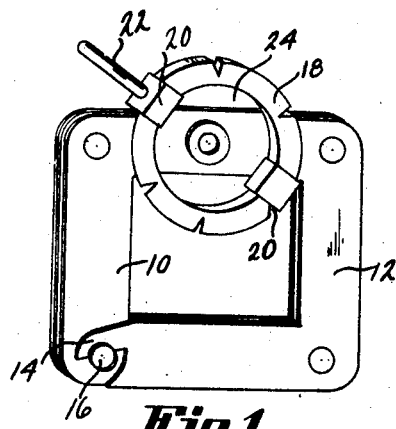
Figure 2:
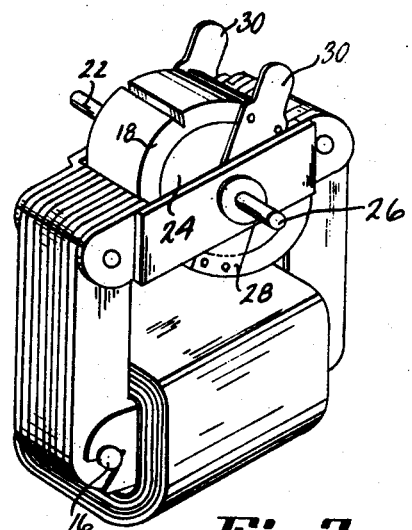
Figure 3:
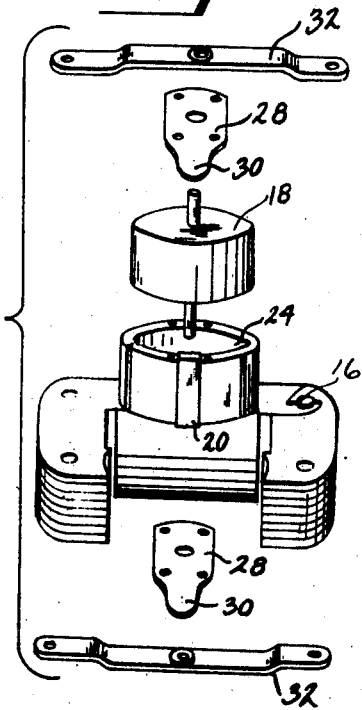
Figure 4:
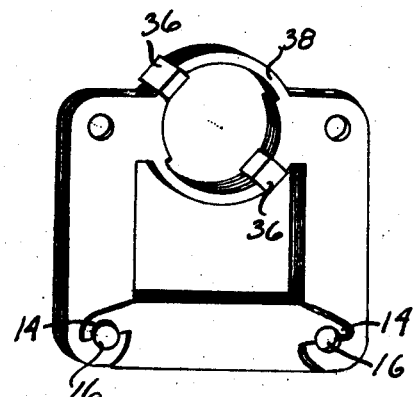

In the drawing, Fig. 1 discloses a perspective view of a motor with the windings removed. Fig. 2 discloses a perspective view of a modification. Fig. 3 discloses an exploded view of the motor disclosed in Fig. 2. Fig. 4 discloses another modification.

In the embodiment shown for purposes of illustration a ferromagnetic ring or sleeve linked by a plurality of choke coils arranged in spaced relation is interposed between the rotor and the field poles of the rotor. When this ferromagnetic sleeve is adjusted together with the choke coils thereon the effectiveness of the shaded flux is altered. Likewise the choke coils have been mounted for adjustment from one pole to another whereby the direction of rotation may be reversed and the speed may be varied from maximum to zero depending upon the position of the choke coils. This change of the position of the choke coils may be effected by mounting the choke coil surrounding a metallic ring, preferably of ferromagnetic material that is concentric with the rotor and surrounding the same, the choke coils being fixed in a fixed relation with respect to said ring so that as the ring is rotated on an axis concentric with the axis of the rotor the speed of the rotor is changed without changing the load, without changing the frequency and the magnitude of the voltage. This change of speed and direction of rotation may also be effected by providing choke coils movably mounted on a bridge or extension spanning the pole pieces.

In the drawing, the reference characters 10 and 12 indicate complementary portions of the laminae that are jointed and interlocked along the zigzag line 14, held in position by rivets or retaining members 16. The laminations 10 and 12 terminate along arcuate surfaces supporting an annular ring or sleeve 18, preferably of magnetic material, supporting the choke coils 20 diametrically arranged thereon.

The annular ring is mounted in the flux path and supplies shaded and unshaded flux to the rotor. The ratio between the shaded and unshaded flux may be varied by shifting the position of the choke coils by rotating the annular ring 18. When in either extreme position the maximum shaded flux enters the rotor and as the choke coils are shifted toward the center the shaded flux decreases to zero as the choke coil coincides with the mechanical neutral plane.

A handle 22 suitably attached either to the choke coil or sleeve 18 permits the adjustment of the sleeve 18 and the choke coil thereon so as to change the relative ratio between the shaded and unshaded flux and so as to shift the choke coil from one pole to another thereby causing the speed of the rotor 24 to be varied from maximum to minimum and to be reversed depending upon the position of the choke coil 20.

As shown in the modification disclosed in Fig. 2, and more clearly shown in Fig. 3, the sleeve 18 may be supported on the rotor shaft 26 by brackets 28 terminating in the handles 30. By this arrangement the sleeve 18 is in effect carried by the bearing brackets 32 that are suitably riveted to the stator laminations 10 and 12.

In the modification disclosed in Fig. 4 the choke coils 36 are movably mounted upon the extensions 38 extending from pole to pole so that as the choke coil 36 is slid upon the extensions the speed may be changed and the direction of rotation reversed.

The zigzag joint of the laminations has been more fully described in my co-pending application filed February 19, 1934, Serial No. 711,967, issued into Patent 2,047,487.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An induction motor including a stator having a plurality of pole pieces, a winding linking the stator for supplying flux thereto, a rotor mounted in the flux path, and magnetic bridges between the pole pieces and adjustable means for shifting the phase of the portion of the flux passing through the bridges, the adjustment of said means causing a reversal of the effective direction of shift of the magnetic field with respect to the rotor.

2. An induction motor including a plurality of pole pieces, a rotor, magnetic bridges between said pole pieces, choke coils linking said bridges, and means for shifting the choke coils so as to vary the speed of the motor.

3. In an induction motor, a movable choke coil surrounding a band of magnetizable material interposed between the poles thereof so as to influence the speed of the motor.

4. A variable speed induction motor including a stator, a rotor, a sleeve surrounding the rotor, said sleeve being adjustably mounted in the stator and single turn closed coils linked tangentially upon said sleeve with respect to said rotor to shift the phase of the flux linking said coils, the adjustment of said sleeve influencing the speed of the motor.

5. A variable speed induction motor, including a stator, a rotor, a sleeve rotatably mounted in said stator, and immovable choke coils linking said sleeve, the adjustment of which shifts the choke coils so as to influence the speed of the motor.

6. A variable speed induction motor including a stator having an adjustably mounted magnetic sleeve, a rotor, choke coils located between opposite poles of the stator and interlinked with the magnetic sleeve for supplying lagging flux from the stator to the rotor, the adjustment of the sleeve changing the location of such lagging flux with reference to the rotor.

7. A reversible induction motor including an adjustably mounted choke coil arranged to be shifted from one pole to another to cause the direction of rotation of the motor to be reversed.

8. A reversible induction motor including a pair of adjustably mounted choke coils, said choke coils being arranged to be adjusted in unison from the tips of one pair of poles to the adjacent tips of another pair of poles so as to reverse the direction of rotation of the motor.

9. A reversible induction motor including a plurality of pole pieces, a rotor, a plurality of adjustably mounted choke coils for supplying a lagging flux, at least one coil per pole, said choke coils being arranged to be shifted from one pole to another to reverse the rotor, and means for shifting said choke coils in unison.

10. A variable speed induction motor including a stator, a rotor, a pair of brackets carried by the stator in which the rotor is journaled, a sleeve surrounding the rotor also journaled on the shaft, said sleeve being adjustably mounted with respect to the stator, and choke coils linking a side of said sleeve, the adjustment of which influences the speed of the rotor.

11. A variable speed induction motor including a stator, a rotor, a tubular sleeve adjustably mounted intermediate the stator and rotor, a plurality of choke coils linking a side of said sleeve, the stator and the sleeve having a relative movement whereby the area of the lagging flux is varied to influence the speed of the motor.

12. A reversible induction motor including a stator having magnetic bridges extending from one pole tip to the adjacent pole tip, and choke coils having the axis thereof arranged in tangential relation with respect to the rotor, said choke coils being adjustably mounted so as to shift the shaded flux from one pole tip to the other.

13. A reversible induction motor including a stator having a rotatably mounted sleeve, a rotor mounted within said sleeve, and choke coils carried by said sleeve, said coils being tangentially arranged with respect to the rotor for supplying shaded flux to the rotor rotating in a direction depending upon the adjustment of the sleeve.

14. An induction motor including a rotor, a stator having magnetic bridges integral with and extending from one pole tip to the adjacent pole tip so as to surround the rotor, and choke coils linking said bridges, the axis of the choke coils being tangentially arranged with respect to the rotor and supplying a shaded flux thereto.

15. A reversible induction motor including a rotor, a stator having a plurality of poles, each connected to the adjacent poles by magnetic bridges provided with internal notches so as to have an arcuate surface arranged in spaced relation from the rotor, and a plurality of choke coils adjustably mounted, one upon each magnetic bridge with one side of the coil seated in the notch, the shifting of the coils from one pole to another casing a reversal of the direction of rotation of the rotor.

16. An induction motor including a stator having a plurality of pole pieces, a winding linking the stator for supplying flux thereto, a rotor mounted in the flux path, and magnetic bridges between the pole pieces, each of said bridges being provided with an internal notch having an arcuate surface arranged in spaced relation with respect to the rotor, and adjustable means seated in said notches for shifting the phase of the portion of the flux passing through the bridges, the adjustment of said means causing a reversal of the effective direction of the shift of the magnetic field with respect to the rotor.

17. A variable speed induction motor including a stator, a rotor having a shaft, means fixedly attached to the stator, said means having bearings for supporting the rotor shaft, a sleeve rotatably mounted in said stator, means fixedly attached to the sleeve but rotatably journalled upon the shaft for supporting the sleeve in concentric relation with respect to the rotor, and immovable choke coils linking said sleeve, the adjustment of the sleeve with respect to the stator causing the choke coils to influence the speed of the motor.

WILLIAM JOSEPH O'LEARY.